H. C. PHELPS AND J. C. FOX.
ANTISLAP SPRING FOR PISTON RINGS.
APPLICATION FILED JUNE 20, 1920.
1,422,780.
Patented July 11, 1922.
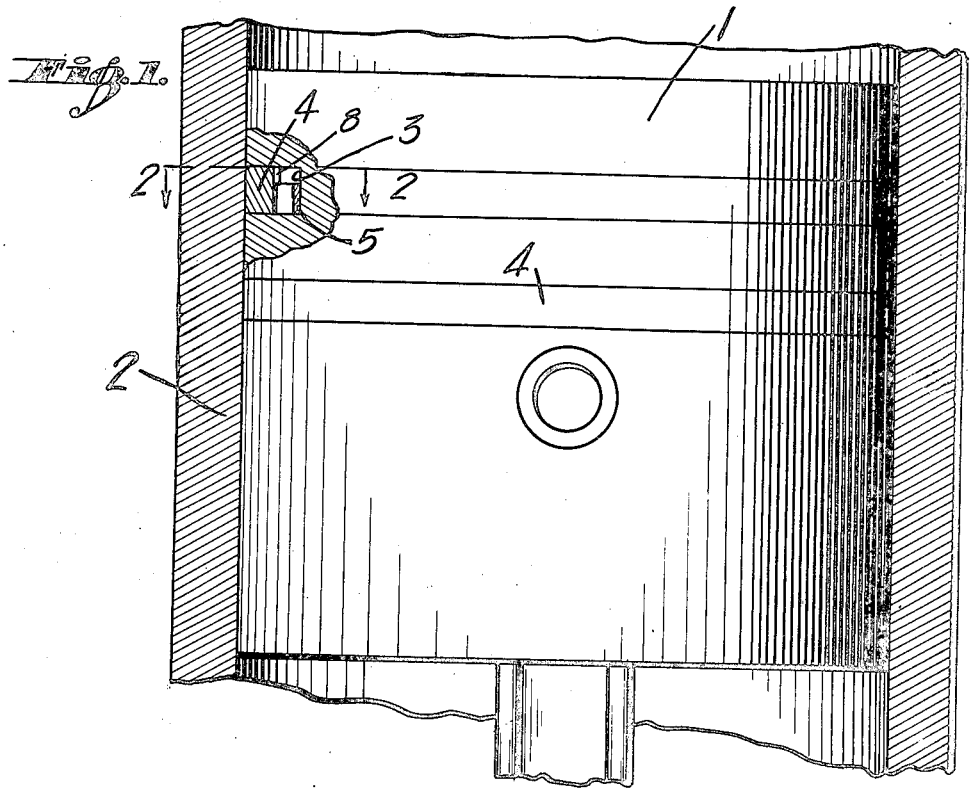
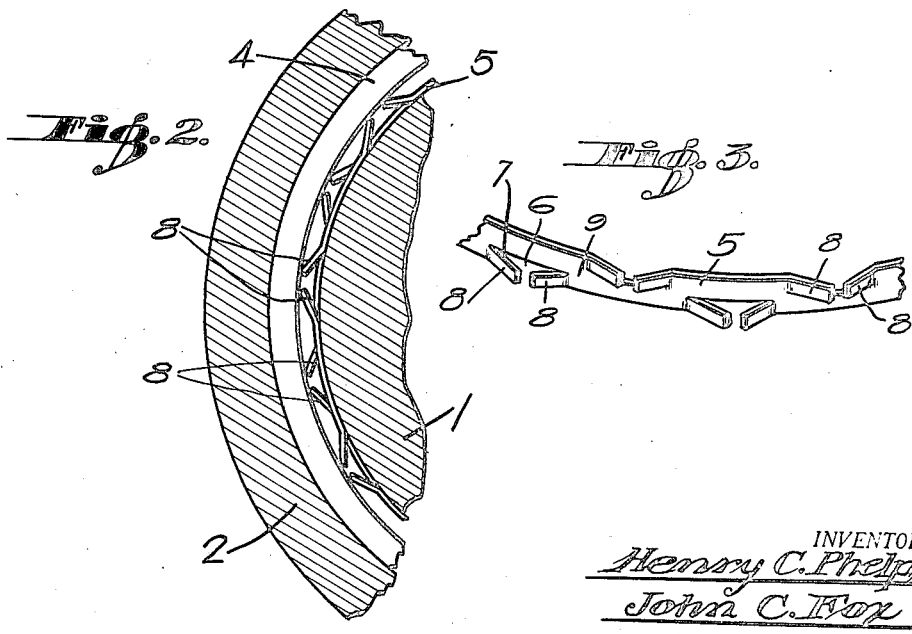
INVENTORS
Henry C. Phelps
John C. Fox
By Hazard & Miller
ATTORNEYS.

ing strip between the lips.
UNITED STATES PATENT OFFICE.

HENRY C. PHELPS AND JOHN C. FOX, OF GLENDALE, CALIFORNIA.

ANTISLAP SPRING FOR PISTON RINGS.

1,422,780.  Specification of Letters Patent.  Patented July 11, 1922.

Application filed June 20, 1921. Serial No. 478,970.

*To all whom it may concern:*

Be it known that we, HENRY C. PHELPS and JOHN C. FOX, citizens of the United States, residing at Glendale, in the county of Los Angeles and State of California, have invented new and useful Improvements in Antislap Springs for Piston Rings, of which the following is a specification.

This invention is a spring piston ring expander employed in connection with a piston ring for preventing slapping of said piston by yieldably urging the same into engagement with the cylinder wall.

The improved spring structure is mounted in the piston ring groove of the piston so as to bear against the inner surface of the piston ring, and the spring structure is so arranged as to provide the desired resiliency, while at the same time affording a yieldably strong construction which is not liable to be broken.

The spring structure includes a single strip of suitable resilient material which is cut so as to form lips which may be bent up in order to form a yielding device. The cuts in the spring strip are so arranged as to form a maximum number of yieldable lips, while at the same time arranging the same so as to not unnecessarily weaken the spring strip.

The invention will be readily understood from the following description of the accompanying drawings, in which:

Figure 1 is a side elevation of a piston mounted in a cylinder which is shown in axial section, and having the piston partly broken away to show the piston ring thereof and the improved antislapping spring means for the piston ring arranged in its groove.

Fig. 2 is a detail section on the line 2—2 of Fig. 1.

Fig. 3 is a perspective view of a portion of the antislapping spring.

In the drawings we have illustrated the invention as employed in connection with a piston 1 mounted in a cylinder 2 and having a piston ring groove 3 in which is received a usual piston ring 4.

A strip 5 of suitable resilient metal is received in groove 3 and back of piston ring 4, and spring lips are bent up from this strip so as to form a yieldable impingement against the piston ring.

The spring lips are preferably so formed in the spring strip as to maintain a maximum width of the spring strip at all points in order to not weaken the latter to an appreciable degree. For this purpose the spring strip is cut at its opposite side edges so as to form the spring lips at the opposite edges of the strip. These lips extend only part way across the strip, and the lips at opposite side edges are arranged in staggered relation along the length of the spring strip. The staggered lips are also longitudinally spaced one beyond another an appreciable distance, and as a consequence it will be noted that uncut portions of the spring strip are arranged at the sides of the lips and also between adjacent lips at the respective sides of the strip.

The lips are preferably formed by transversely slitting the spring strip as shown at 6. These slots alternately extend inwardly from the respective sides of the spring strip and are longitudinally spaced one beyond another. From the inner ends of slots 6, longitudinal slots 7 extend in opposite directions so as to form lips 8. The slots 7 at opposite sides of the spring strip and which are adjacent to one another, are so arranged as to terminate short of one another in order to form an appreciable space 9 of the spring strip between the lips.

The spring lips as thus formed are bent outwardly, as clearly shown in Fig. 3, and the spring strip is then mounted in the groove 3 back of a piston ring so that the spring lips will form a resilient support for the piston ring tending to yieldably urge the latter outwardly against the cylinder wall. As a result slapping of the piston is prevented.

Various changes may be made without departing from the spirit of the invention as claimed.

What is claimed is:

1. A piston ring expander comprising a strip of resilient material alternately transversely slitted from its side edges and longitudinally slotted both ways from the transverse slits, and the ends of the lips thus formed being turned outwardly, the uncut ends of one set of lips being nearly in transverse alinement with the uncut ends of the adjacent lips at the opposite side.

2. The combination with a piston having a groove and a piston ring in the groove, of a piston ring expander comprising a strip of resilient material alternately transversely slitted from its side edges and longitudinally slotted both ways from the transverse slits, and the ends of the lips thus formed being turned outwardly, the uncut ends of one set of lips being nearly in transverse alinement with the uncut ends of the adjacent lips at the opposite side.

In testimony whereof we have signed our names to this specification.

HENRY C. PHELPS.
JOHN C. FOX.